(No Model.) 5 Sheets—Sheet 1.
W. BENTLEY.
DERRICK.
No. 377,544. Patented Feb. 7, 1888.
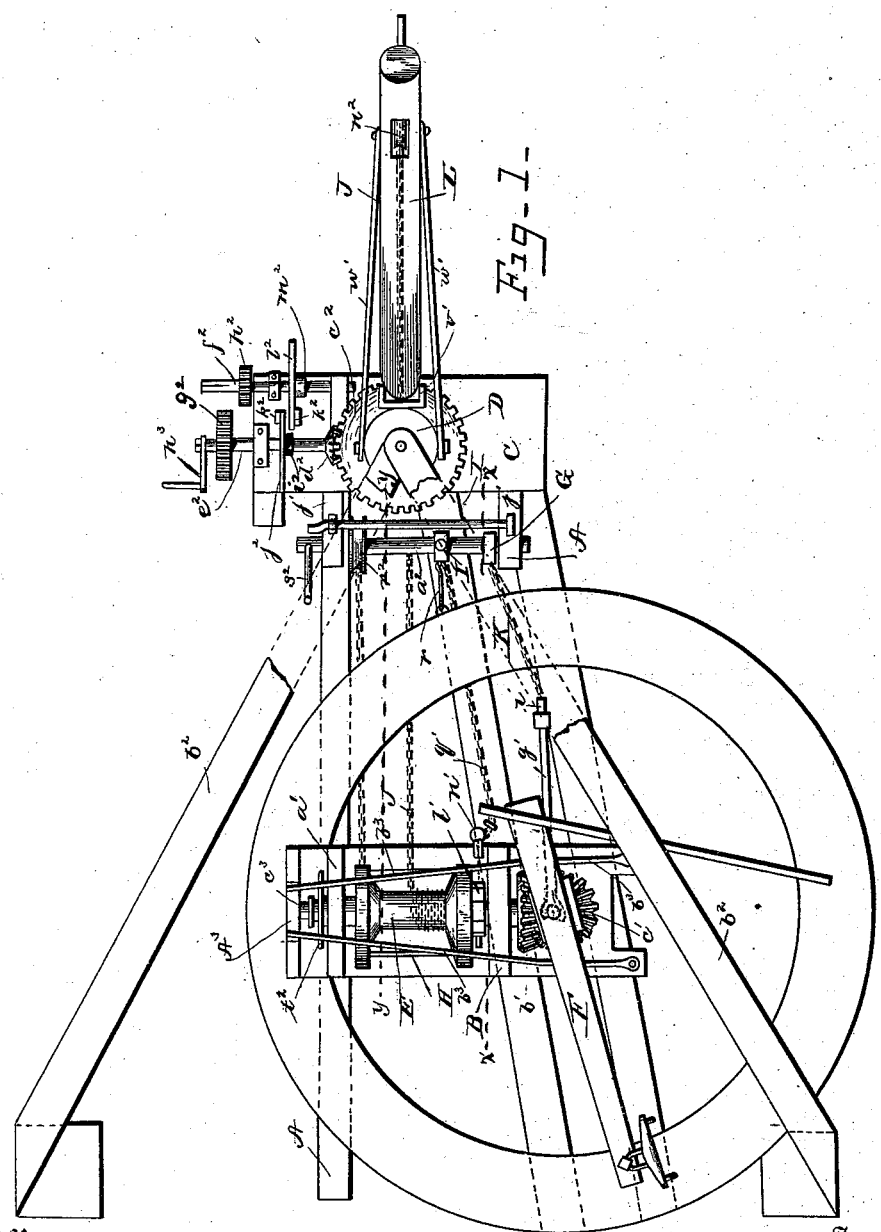
Witnesses
F. L. Durand
F. T. Chapman
Inventor
W. Bentley
By his Attorney P. T. Dodge (No Model.) 5 Sheets—Sheet 2.
W. BENTLEY.
DERRICK.
No. 377,544. Patented Feb. 7, 1888.
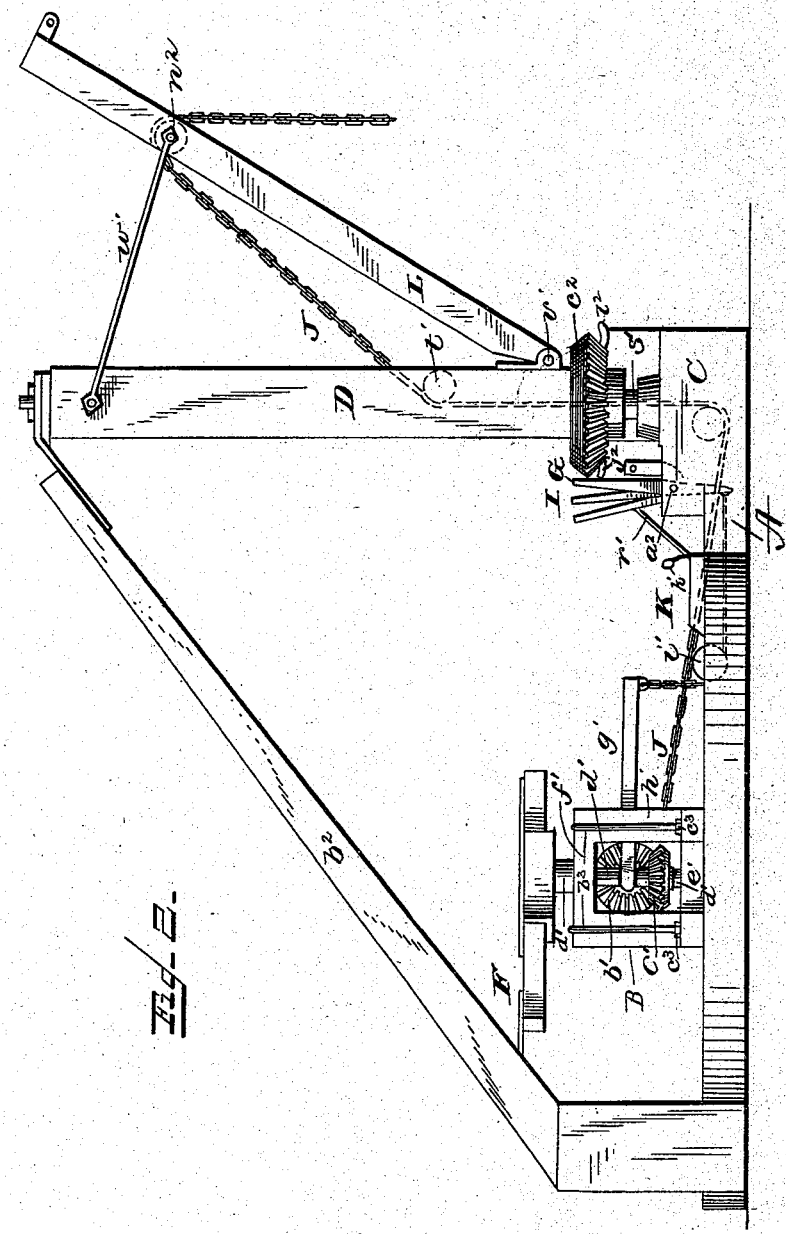
Witnesses
F. L. Durand
F. T. Chapman
Inventor
W. Bentley
By his Attorney P. T. Dodge

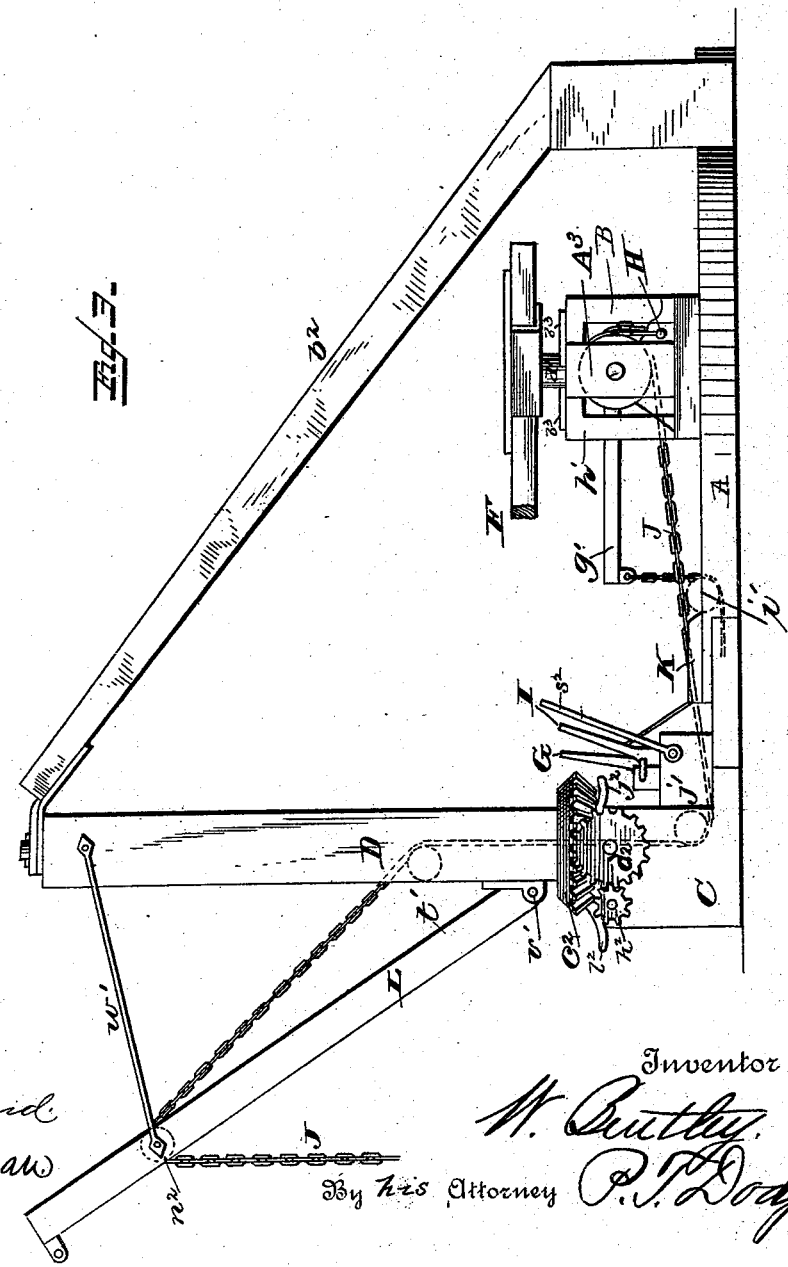

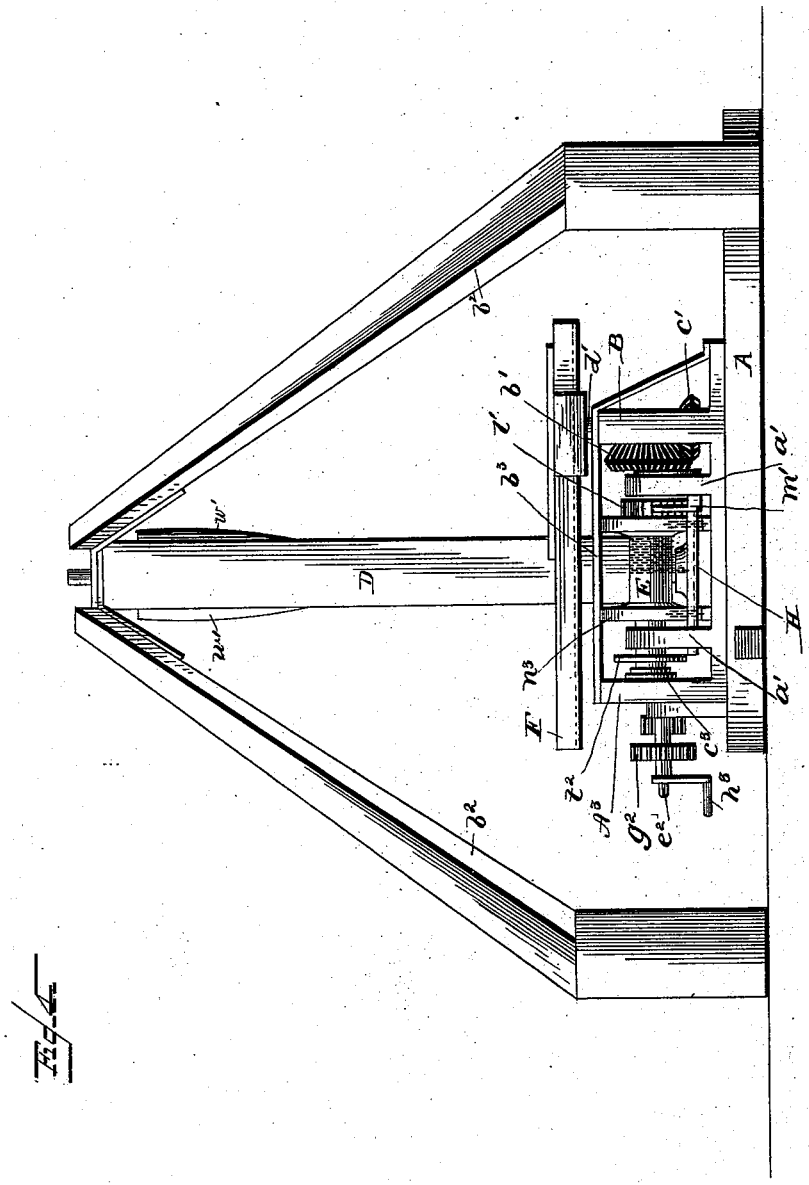

(No Model.) 5 Sheets—Sheet 5.
W. BENTLEY.
DERRICK.
No. 377,544. Patented Feb. 7, 1888.
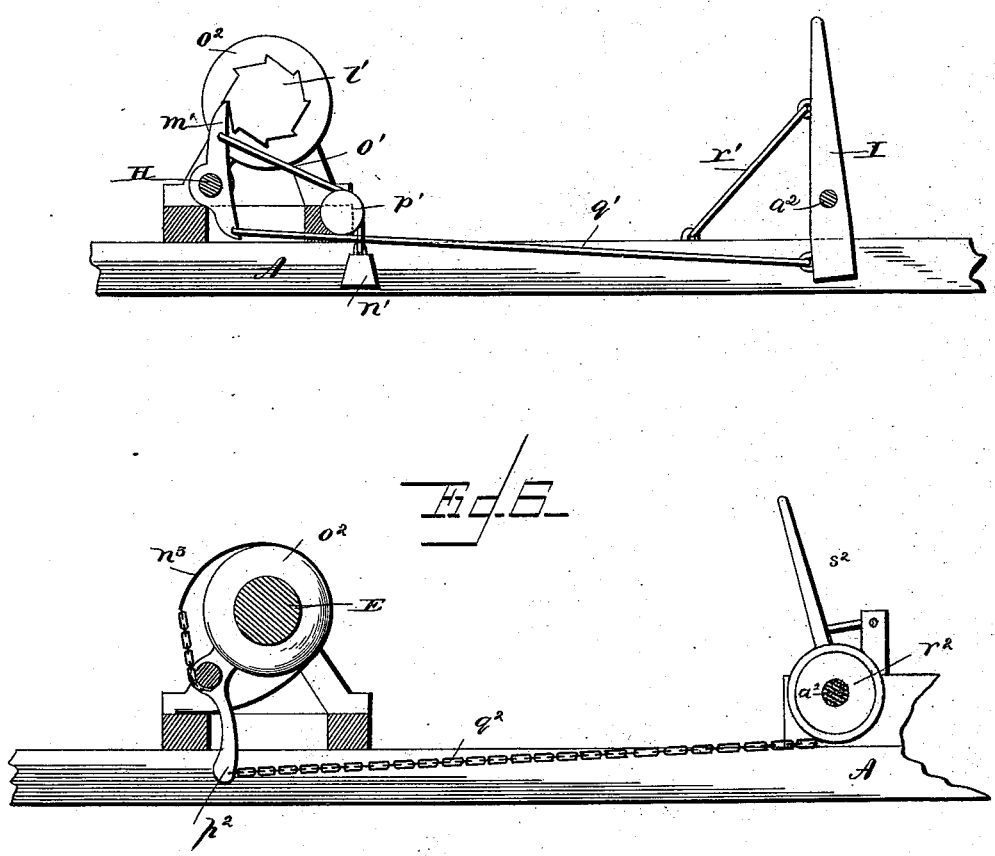
Witnesses
F. L. Durand
F. T. Chapman
Inventor,
W. Bentley
By his Attorney P. T. Dodge

UNITED STATES PATENT OFFICE.

WILLIAM BENTLEY, OF BISHOP'S CROSSING, QUEBEC, CANADA.

DERRICK.

SPECIFICATION forming part of Letters Patent No. 377,544, dated February 7, 1888.

Application filed April 25, 1887. Serial No. 235,981. (No model.)

*To all whom it may concern:*

Be it known that I, WILLIAM BENTLEY, a citizen of Canada, residing at Bishop's Crossing, in the county of Wolfe and Province of Quebec, Canada, have invented certain new and useful Improvements in Derricks; and I do hereby declare the following to be a full, clear, and exact description of the same.

My invention relates to improvements in derricks in which a horse-power is used to work a crab in connection with a mast and boom apparatus; and the objects of my invention are, first, to provide a mechanism by which the working of the crab can be controlled by mechanism placed outside of the horse-track and near the foot of the mast; and second, to facilitate the swinging of the boom by means of gearings applied to the mast. I attain these objects by the mechanism illustrated in the accompanying drawings, in which—

Figure 1 is a plan view of the derrick. Figs. 2 and 3 are side views of the same as it appears from the opposite directions. Fig. 4 is a rear view. Fig. 5 is a sectional elevation on line $x\,x$, Fig. 1, showing the pawl and ratchet-wheel on the chain-barrel with the lever for working them attached. Fig. 6 is a similar view on line $y\,y$, Fig. 1, showing the brake-working device.

Similar letters refer to similar parts in the several figures.

The sills A are secured firmly to the ground, and to these the frame B of the crab and step-block C of the mast D are rigidly fixed. The chain-barrel E is journaled in the brackets $a'$ of the crab-frame. On one of the projecting journals of the chain-barrel is secured a bevel gear-wheel, $b'$, which is driven by the bevel-pinion $c'$ on the spindle $d'$. This spindle is journaled in the pivot-box $e'$ and in the cap $f'$, and, projecting through said cap, has fixed on its top end the sweep or lever F, to which the horse is attached. The pinion $c'$ remains down out of gear with the wheel $b'$, except when it is raised by the lever $g'$, which is fulcrumed in the post $h'$, and which has on its inner end a fork, the tines of which span and engage in a groove formed in the spindle $d'$. The outer end of the lever $g'$ is drawn down by a chain which passes under the pulley $i'$, which is pivoted to the sills A, and along to the lever G, to the lower end of which it is attached.

The lever G is fulcrumed on the shaft $a^2$, which is journaled in the blocks $j$. When the top end of this lever is thrown down forward—where it may be held by throwing the loop $k'$ over its end—the bevel-pinion $c'$ will thereby be moved into gear with the bevel-wheel $b'$ on the chain-barrel journal.

A ratchet-wheel, $l'$, is secured to one end of the chain-barrel, and is for the purpose of preventing its being turned backward should any accident happen to the moving power or its connections. A pawl, $m'$, is pivoted on the shaft H, which is journaled in the frame-brackets $a'$, and is held against the ratchet-wheel by the weight $n'$, attached to the pawl by the cord $o'$, which passes over the pulley $p'$. A rod or chain, $q'$, connects the lower end of the pawl, below the shaft H, with the lower end of the lever I, which, like the lever G, is loosely fulcrumed on the shaft $a^2$.

When the top or handle end of the lever I is moved toward the crab and held in that position by the hook $r'$, the pawl $m'$ is thereby held away from the ratchet-wheel. The use of this pawl and ratchet-wheel will allow of the stopping and resting of the horse, whenever desired, or even its being detached from the sweep for any purpose, while a load may be suspended from the derrick.

The lifting-chain J is attached to the chain-barrel E, and, passing under the bridge K in the horse-track and under a guide-pulley placed below the mast-pivot, enters the mast D through the central opening in the step-pivot $s'$, thence it passes up through the mast-chamber, over the sheaf $t'$, and out to the head of the boom L, through which it passes over the sheaf $n^2$, and down to the load or weight that is being lifted. The boom stands upon the knuckle $v'$, which is secured to the mast, while the head of the boom and the head of the mast are connected by the tie-rods $w'$. The mast is steadied by guy-rods $b^2$, such as are commonly known in boom-derricks.

The mechanism for turning the mast and boom consists of the bevel gear-wheel $c^2$, which is centered on the mast and secured rigidly to it, the bevel-pinion $d^2$, to drive the wheel $c^2$, and keyed on the shaft $e^2$, which, with the counter-shaft $f^2$, are boxed on the step-block C, and the pinion $h^2$ on the shaft $f^2$. The outer ends of the shafts $e^2$ and $f^2$ are squared to receive the hand-crank $h^3$, by which they are turned.

The pinion $d^2$ is held in gear with the wheel $c^2$ by the collar $i^2$, formed on the shaft $e^2$, backed by the shipping-hand $j^2$, which is hinged to the lugs $k^2$. To draw the pinion $d^2$ out of gear, the hand $j^2$ is raised to allow the collar to pass under it, when the shaft $e^2$ may be drawn endwise away from the mast. The hand then being dropped on the shaft in front of the collar, will keep the pinion $d^2$ clear of the wheel $c^2$. The pinion $h^2$ is keyed on the counter-shaft $f^2$, and may be engaged with or disengaged from a gear-wheel, $g^2$, on the shaft $e^2$ by raising the shipping-hand $l^2$ over the collar $m^2$, so as to allow of the counter-shaft being moved endwise in its bearings.

For swinging heavy weights on the derrick, the hand-crank $h^3$ is used on the counter-shaft, by which the power is greatly increased; but for light weights it may be used on the shaft $e^2$.

The brake device of the crab is as follows: To the shaft H are attached, by short chains, the ends of the brake-bands $n^3$, which pass part way around the peripheries of the chain-barrel flanges $o^2$, and have their other ends secured to the crab-frame. An arm, $p^2$, is keyed on the shaft H, having a chain or rod, $q^2$, attached to its lower end. The other end of this chain is secured to the pulley $r^2$, which is firmly fixed on the shaft $a^2$, and to which also is secured the hand-lever $s^2$. From this it will be seen that the brakes may be applied to the chain-barrel by moving the hand-lever $s^2$.

By means of the hand-wheel $t^2$, which is fixed on one of its journals, the chain-barrel may be turned and any slack chain taken up. A standard, $A^3$, is attached to the crab-frame B, and has its top end tied to the cap $f'$ by the rods $b^3$. A nut, $c^3$, is screwed into this standard and holds against the end of the chain-barrel journal, and thus holds the crab mechanism compactly together.

Having thus described my invention, what I claim, and desire to secure by Letters Patent, is—

1. In a horse-power derrick, the combination, with a winding-drum provided with brake, pawl, and ratchet, and gear-connections, of a rock-shaft, $a^2$, and lever secured thereto and operating the brake, and the levers fulcrumed on said shaft and operating said connections, substantially as described.

2. The combination, in a horse-power derrick, of the crab having the frame B, brackets $a'$, chain-barrel E, gears $b'$ and $c'$, spindle $d'$, and sweep F, and the mast D and boom L, with the gear-wheel $c^2$, pinion $d^2$, shafts $e^2$ and $f^2$, wheel $g^2$, and pinion $h^2$, and hand-crank, as shown and specified.

3. The combination of the mast D, boom L, wheel $c^2$, and pinion $d^2$, with the shaft $e^2$, having the collar $i^2$, counter-shaft $f^2$, having the collar $m^2$, and the shipping-hands $j^2$ and $l^2$, hinged to the lugs $k^2$, substantially as shown, and for the purpose set forth.

Signed at Dudswell this 28th day of March, 1887.

WILLIAM BENTLEY.

In presence of—
FAIRMAN HALL,
ROBERT HARDCASTLE.